US010204078B2

(12) United States Patent
Tolpin

(10) Patent No.: US 10,204,078 B2
(45) Date of Patent: *Feb. 12, 2019

(54) TECHNIQUES FOR RENDERING MEDIA AS LAYERS

(71) Applicant: RenderX, Inc., Palo Alto, CA (US)

(72) Inventor: David Tolpin, Beer Sheva (IL)

(73) Assignee: RenderX, Inc., Palo Alto, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/158,003

(22) Filed: May 18, 2016

(65) Prior Publication Data

US 2016/0267055 A1    Sep. 15, 2016

Related U.S. Application Data

(63) Continuation of application No. 11/830,086, filed on Jul. 30, 2007, now Pat. No. 9,436,667, which is a continuation-in-part of application No. 11/278,246, filed on Mar. 31, 2006, now abandoned, which is a continuation of application No. 09/699,806, filed on Oct. 30, 2000, now Pat. No. 7,024,621.

(60) Provisional application No. 60/203,809, filed on May 19, 2000.

(51) Int. Cl.
| G06F 17/00 | (2006.01) |
| G06F 17/21 | (2006.01) |
| G06F 17/24 | (2006.01) |
| G06F 17/30 | (2006.01) |
| G06F 17/22 | (2006.01) |

(52) U.S. Cl.
CPC ........ *G06F 17/211* (2013.01); *G06F 17/2247* (2013.01); *G06F 17/243* (2013.01); *G06F 17/30899* (2013.01)

(58) Field of Classification Search
CPC .............................. G06F 17/211; G06F 17/212
See application file for complete search history.

(56) References Cited

U.S. PATENT DOCUMENTS

| 4,503,515 A |   | 3/1985  | Cuan et al. |
| 4,630,296 A | * | 12/1986 | Haaker ................. G06T 11/006 378/2 |
| 4,648,067 A |   | 3/1987  | Repass et al. |

(Continued)

FOREIGN PATENT DOCUMENTS

| EP | 0094546 | 11/1983 |
| EP | 0398477 | 11/1990 |

OTHER PUBLICATIONS

"U.S. Appl. No. 09/699,530, Advisory Action dated Dec. 8, 2004", 4 pgs.

(Continued)

*Primary Examiner* — Laurie A Ries
(74) *Attorney, Agent, or Firm* — Schwegman Lundberg & Woessner, P.A.

(57) ABSTRACT

Techniques are provided for rendering media as layers. Logical units of media form a media stream. The media stream as a whole is processed to divide components within the units into assigned layers. The layers are then formatted to a desired output format in parallel with one another when dependencies permit. Next, each unit of media is rendered to the output format by superimposing or merging multiple layers to reconstruct each unit of media in the output format.

20 Claims, 3 Drawing Sheets

(56) References Cited

U.S. PATENT DOCUMENTS

| | | | |
|---|---|---|---|
| 5,097,418 | A | 3/1992 | Nurse et al. |
| 5,111,397 | A | 5/1992 | Chirokas et al. |
| 5,113,494 | A | 5/1992 | Menendez et al. |
| 5,381,523 | A | 1/1995 | Hayashi |
| 5,420,695 | A | 5/1995 | Ohta |
| 5,421,015 | A | 5/1995 | Khoyi et al. |
| 5,450,536 | A | 9/1995 | Rosenberg et al. |
| 5,495,561 | A | 2/1996 | Holt |
| 5,600,771 | A | 2/1997 | Hayashi et al. |
| 5,819,301 | A | 10/1998 | Rowe et al. |
| 5,845,299 | A | 12/1998 | Arora et al. |
| 5,860,073 | A | 1/1999 | Ferrel et al. |
| 5,870,770 | A | 2/1999 | Wolfe |
| 5,883,635 | A | 3/1999 | Rao et al. |
| 5,893,127 | A | 4/1999 | Tyan et al. |
| 5,895,477 | A | 4/1999 | Orr et al. |
| 5,900,002 | A | 5/1999 | Bottomly |
| 6,021,202 | A | 2/2000 | Anderson et al. |
| 6,088,708 | A | 7/2000 | Burch et al. |
| 6,154,756 | A | 11/2000 | Hearn et al. |
| 6,230,170 | B1 | 5/2001 | Zellweger et al. |
| 6,292,809 | B1 | 9/2001 | Edelman |
| 6,300,947 | B1 | 10/2001 | Kanevsky |
| 6,415,305 | B1 | 7/2002 | Agrawal et al. |
| 6,421,694 | B1 | 7/2002 | Nawaz et al. |
| 6,584,476 | B1 | 6/2003 | Chatterjee et al. |
| 6,613,099 | B2 | 9/2003 | Crim |
| 6,661,919 | B2 | 12/2003 | Nicholson et al. |
| 6,668,354 | B1 * | 12/2003 | Chen .................... G06F 17/211 715/255 |
| 6,694,487 | B1 | 2/2004 | Ilsar |
| 6,809,745 | B1 * | 10/2004 | O'Donnell ............ G06T 15/503 345/634 |
| 6,948,115 | B2 | 9/2005 | Aizikowitz et al. |
| 6,971,062 | B1 | 11/2005 | Tolpin |
| 7,024,621 | B1 | 4/2006 | Tolpin |
| 7,454,695 | B1 | 11/2008 | Grigoriev |
| 8,381,110 | B2 * | 2/2013 | Barger .................... G06F 17/27 715/201 |
| 9,436,667 | B2 | 9/2016 | Tolpin |
| 2002/0069221 | A1 | 6/2002 | Rao et al. |
| 2004/0093187 | A1 * | 5/2004 | Dames ................. G06K 7/0008 702/188 |
| 2004/0133569 | A1 * | 7/2004 | Munetsugu ....... G06F 17/30843 |
| 2005/0193396 | A1 * | 9/2005 | Stafford-Fraser ..... G06F 3/1438 719/328 |
| 2006/0179406 | A1 | 8/2006 | Tolpin |

OTHER PUBLICATIONS

"U.S. Appl. No. 09/699,530, Final Office Action dated Aug. 12, 2004", 20 pgs.

"U.S. Appl. No. 09/699,530, Non Final Office Action dated Feb. 12, 2004", 15 pgs.

"U.S. Appl. No. 09/699,530, Non Final Office Action dated Mar. 1, 2005", 6 pgs.

"U.S. Appl. No. 09/699,530, Notice of Allowance dated Jul. 20, 2005", 10 pgs.

"U.S. Appl. No. 09/699,530, Response filed May 21, 2004 to Non Final Office Action dated Feb. 12, 2004", 10 pgs.

"U.S. Appl. No. 09/699,530, Response filed Jun. 1, 2005 to Non Final Office Action dated Mar. 1, 2005", 8 pgs.

"U.S. Appl. No. 09/699,530, Response filed Nov. 12, 2004 to Final Office Action dated Aug. 12, 2004", 11 pgs.

"U.S. Appl. No. 09/699,572, Advisory Action dated May 5, 2005", 3 pgs.

"U.S. Appl. No. 09/699,572, Final Office Action dated Jan. 5, 2006", 15 pgs.

"U.S. Appl. No. 09/699,572, Final Office Action dated Jan. 13, 2005", 15 pgs.

"U.S. Appl. No. 09/699,572, Final Office Action dated Jun. 28, 2005", 17 pgs.

"U.S. Appl. No. 09/699,572, Non Final Office Action dated Apr. 21, 2004", 10 pgs.

"U.S. Appl. No. 09/699,572, Notice of Allowance dated Jul. 3, 2008", 5pgs.

"U.S. Appl. No. 09/699,572, Response filed Apr. 13, 2005 to Final Office Action dated Jan. 13, 2005", 9 pgs.

"U.S. Appl. No. 09/699,572, Response filed Jun. 23, 2008 to Decision on Appeal dated Apr. 23, 2008", 6 pgs.

"U.S. Appl. No. 09/699,572, Response filed Jul. 21, 2004 to Non Final Office Action dated Apr. 21, 2004", 7 pgs.

"U.S. Appl. No. 09/699,572, Response filed Sep. 28, 2005 to Final Office Action dated Jun. 28, 2005", 9 pgs.

"U.S. Appl. No. 09/699,806, Advisory Action dated Dec. 13, 2004", 3 pgs.

"U.S. Appl. No. 09/699,806, Final Office Action dated Sep. 28, 2004", 15 pgs.

"U.S. Appl. No. 09/699,806, Non Final Office Action dated Feb. 26, 2004", 15 pgs.

"U.S. Appl. No. 09/699,806, Non Final Office Action dated Apr. 5, 2005", 15 pgs.

"U.S. Appl. No. 09/699,806, Notice of Allowance dated Aug. 1, 2005", 16 pgs.

"U.S. Appl. No. 09/699,806, Response filed May 26, 2004 to Non Final Office Action dated Feb. 26, 2004", 9 pgs.

"U.S. Appl. No. 09/699,806, Response filed Jul. 5, 2005 to Non Final Office Action dated Apr. 5, 2005", 8 pgs.

"U.S. Appl. No. 09/699,806, Response filed Nov. 29, 2004 to Final Office Action dated Sep. 28, 2004", 9 pgs.

"U.S. Appl. No. 11/278,246, Final Office Action dated Jan. 31, 2007", 19 pgs.

"U.S. Appl. No. 11/830,086, Advisory Action dated Jan. 5, 2015", 3 pgs.

"U.S. Appl. No. 11/830,086, Final Office Action dated Jun. 9, 2011", 17 pgs.

"U.S. Appl. No. 11/830,086, Final Office Action dated Oct. 21, 2014", 20 pgs.

"U.S. Appl. No. 11/830,086, Non Final Office Action dated Mar. 17, 2014", 18 pgs.

"U.S. Appl. No. 11/830,086, Non Final Office Action dated Oct. 13, 2015", 18 pgs.

"U.S. Appl. No. 11/830,086, Non Final Office Action dated Nov. 17, 2010", 15 pgs.

"U.S. Appl. No. 11/830,086, Notice of Allowance dated May 3, 2016", 6 pgs.

"U.S. Appl. No. 11/830,086, PTO Response to Rule 312 Communication dated Aug. 1, 2016", 2 pgs.

"U.S. Appl. No. 11/830,086, Response filed Feb. 17, 2011 to Non Final Office Action dated Nov. 17, 2010", 8 pgs.

"U.S. Appl. No. 11/830,086, Response filed Jun. 17, 2014 to Non Final Office Action dated Mar. 17, 2014", 9 pgs.

"U.S. Appl. No. 11/830,086, Response filed Sep. 20, 2011 to Final Office Action dated Jun. 9, 2011", 8 pgs.

"U.S. Appl. No. 11/830,086, Response filed Dec. 22, 2014 to Final Office Action dated Oct. 21, 2014", 8 pgs.

"U.S. Appl. No. 11/830,086, Resposne filed Jan. 13, 2016 to Non-Final Office Action dated Oct. 13, 2015", 9 pgs.

"U.S. Appl. No. 11/830,086, 312 Amendment filed Jul. 12, 2016", 3 pgs.

"European Application Serial No. 01939208.3, Office Action dated Nov. 6, 2008", 7 pgs.

"European Application Serial No. 01939208.3, Response filed Apr. 20, 2009 to Office Action dated Nov. 6, 2008", 7 pgs.

"International Application Serial No. PCT/US01/16376, International Preliminary Report dated Sep. 26, 2003", 3 pgs.

"International Application Serial No. PCT/US01/16376, International Search Report dated Jun. 27, 2003", 3 pgs.

"International Application Serial No. PCT/US01/16376, Written Opinion dated Jul. 21, 2003", 2 pgs.

"SAS/GRAPH Statements", [online]. [Jul. 18, 2005]. Retrieved from the Internet: <URL: http://v8doc.sas.com/sashtml/gref/z0724351.html>, Copyright 1999 by SAS Institute Inc, USA, (1999), 1-2, 1-19.

(56) References Cited

OTHER PUBLICATIONS

"XSL-FO Floats and Footnotes", http://www.phptr.com/articles/article.asp?p=101622, Professional Technical Reference, (Oct. 24, 2003), 5 pgs.

* cited by examiner

TECHNIQUES FOR RENDERING MEDIA AS LAYERS

RELATED APPLICATIONS

The present invention is a Continuation of U.S. application Ser. No. 11/830,086 entitled: "Techniques for Rendering Media as Layers" filed on Jul. 30, 2007, which is a Continuation-In Part of co-pending U.S. application Ser. No. 11/278,246 entitled: "Methods and Systems for Rendering Electronic Data" filed on Mar. 31, 2006; application Ser. No. 11/278,246 claims priority to U.S. Pat. No. 7,024,621 filed on Oct. 30, 2000; and U.S. Pat. No. 7,024,621 is a non provisional that claims priority to U.S. Provisional No. 60/203,809 filed on May 19, 2000; the disclosures all of which are incorporated by reference herein.

FIELD

The invention relates generally to data processing and more particularly to techniques for rendering media as layers.

BACKGROUND

Formatting electronic data into human-readable form is of widespread use nowadays. Examples include formatting of data in various formats transmitted by means of World Wide Web (WWW) for viewing in a WWW browser, for formatting data to publish books, magazines, newspapers and other paper-based media, and/or for formatting database reports, etc. In addition, multimedia is regularly formatted into various formats and sometimes delivered via the Internet, such as Internet Protocol (IP) Television (TV) (referred to as IP TV).

Streams of data that comprise documents, World-Wide Web (WWW) sites, videos, etc. often include a plurality of very similar types of data or similar formats for the data that span multiple pages of the document or frames of the video. Yet, present techniques to render these types of data do not account for these similarities when rendering the documents or video streams.

This means that conventional rendering approaches are not adequately taking advantage of improving technology, such as improved processing capabilities, increased network bandwidth, etc. It also means that some devices, such as phones, with limited processing, memory, and bandwidth capabilities are excluded, in some cases, from benefits associated with dynamic data rendering As a result, existing rendering techniques are slower to process than they should be and may require excessive bandwidth capabilities that consumers do not possess; such as that which is apparent when trying to deliver video on digital phones of consumers, which have limited bandwidth and even processing capabilities.

Accordingly, a more efficient technique for rendering media is desirable.

SUMMARY

The techniques presented herein provide method for rendering media as layers. According to an embodiment, a method is presented for rendering media as layers. More specifically, logical units of media are divided into layers, each unit of media having a plurality of components. Next, each layer is concurrently formatted for presentation and each layer is assigned a media sequence. Finally, the formatted layers are superimposed in response to the media sequence for purposes of rendering each unit of media into a final presentation format.

DETAILED DESCRIPTION

Figure 1:
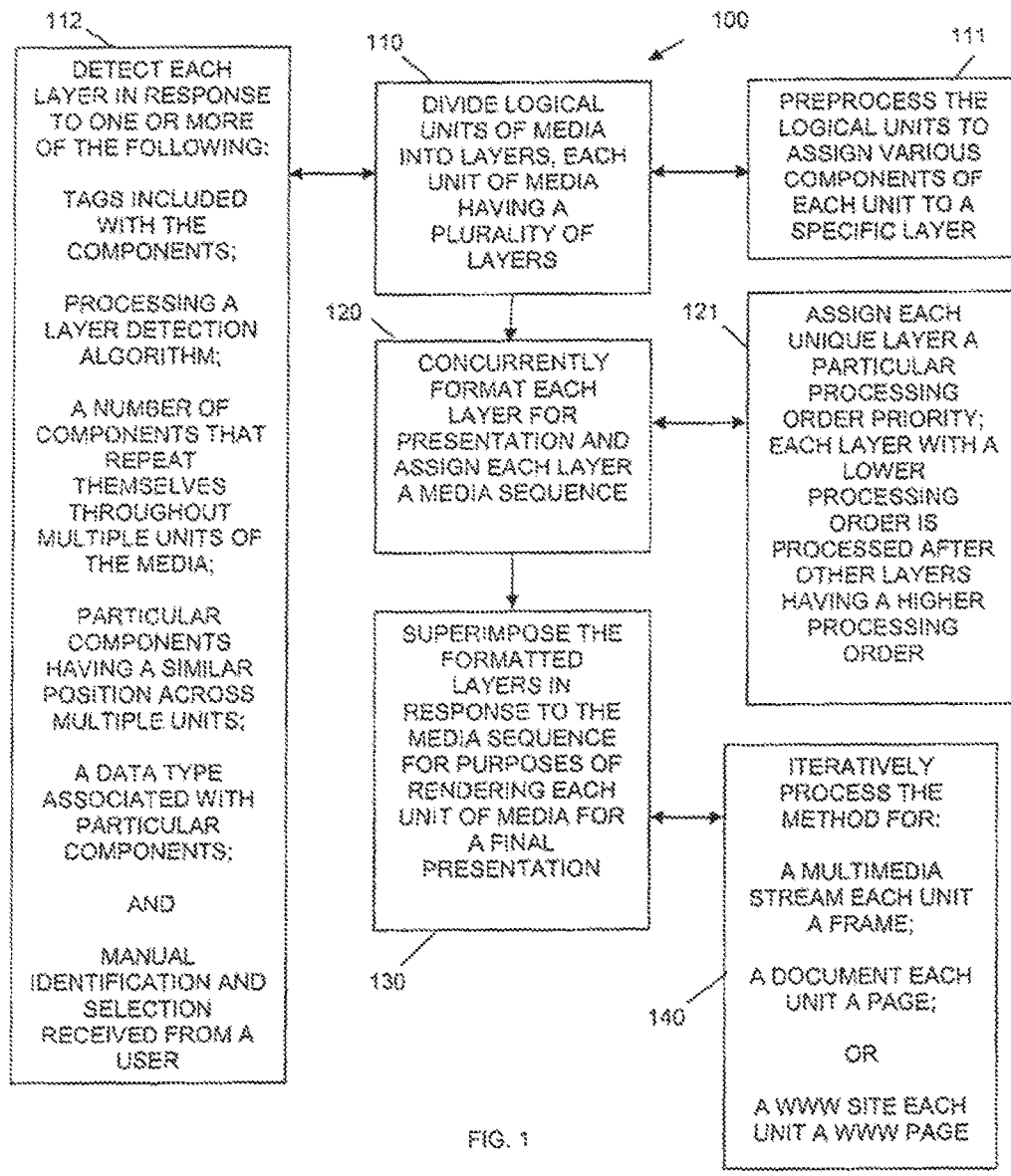
FIG. 1 is a diagram of a method for rendering media as layers, according to an example embodiment.

FIG. 1 is a diagram of a method 100 for rendering media as layers, according to an example embodiment. The method 100 (herein after "layering service") is implemented in a machine-accessible and readable medium and is to process on a machine. The layering service is also accessible and operational over a network, and the network may be wired, wireless or a combination of wired and wireless.

At 110, the layering service divides logical units of media into layers. The logical units combine to form a document, a WWW site, multimedia, and/or video representing the media. Each unit having a plurality of components or objects. The unit may be viewed as a particular page of the document, a particular WWW page of the WWW site, a particular frame of the multimedia or the video. The components or objects represent such things as tables, pictures, text segments, video segments, graphics, etc.

According to an embodiment, at 111, the layering service or another service in communication with the layering service preprocesses the logical units for purposes of assigning various components associated with each unit to a specific layer. That is, each unit is parsed and the components in each unit associated with a specific layer. The assignment of components from the units to specific layers can be achieved in a variety of manner.

For example, at 112, the layering service can detect layer or type of layer in response to the evaluation of the various types and positions of the components included in the units. In some cases, this is achieved via tags that are included as markup within the units. These tags can be in any format, such as but not limited to, Hypertext Markup Language (HTML), Extensible Markup Language (XML), Extensible Style Sheets Language (XSL), Portable Document Format (PDF), Word processing formats, Video encoding formats, etc. A specific and tailored layer detection algorithm may also be used to assign the layers. In addition, a number of components detected throughout the media units may be assigned to a specific layer in response to a particular component repeating itself across multiple units. Still further, some components may have a similar relative position within their respective units of the media; have the same data type, etc. Finally, a user interface may be supplied to a user that permits the user to manual select and assign components to user-defined or available layers that are predefined for assignment.

It is noted that the manner of processing can be more complex. In essence, the order of layering is determined by dependencies identified in the units of the media. So, order of some layers may need processed before other layers can be processed but some groupings of layers can be processed in parallel with one another assuming they have no dependencies. These layers processed in parallel with one another do not necessarily have to be the same type and have the same positioning, etc. For example consider the following layer types and groupings: [1, 2, 3, 4]; [5, 6, 7]; and [8, 9, 10]. The layers 1-4 can be processed in any order including in parallel with one another; but the layers 1-4 have to finish before the layers 5-7 are processed. Similarly, once layers 1-4 are processed, then the layers 5-7 can be processed in any order with one another and evening in parallel. But, layers 8-10 are not processed until layers 1-7 have processed and once they have processed then the layers 8-10 can process in any order including in parallel with one another. The point is that their may be dependencies even hierarchical dependencies that dictate when layers are rendered or processed.

In fact, processing order relations may be quite complex and represented in a graph. In essence what is processed first can be significant over what is processed next. But what is processed first can include multiple layers that can be processed in any order or in parallel with one another and once what is processed first completes what needs to be processed next can be handled.

So, a particular set of layers can include different layers but have a same processing order with one another within the set. In this case, as long as any existing prior layers that must dependently process before the set have processed, then each layer within the set can process in any order, including in parallel with one another.

At 120, the layering service concurrently formats each layer for presentation and assigns each layer a particular media sequence number. In fact, each component within any given layer type can receive its own media sequence number. This may be viewed as a page number within the document or the WWW page; or in the case of multimedia and video the media sequence number may be viewed as a frame number. This media sequence number can be used later in processing (as discussed more completely below) to properly order the components in the rendered version of the media (document, WWW page, multimedia frame, video frame).

In an embodiment, at 121, the layering service assigns each unique layer a particular processing order priority. Each layer with a lower processing order is processed after other layers having a higher processing order. For example, suppose there are 4 types of layers: one for text constants, one for dynamically resolved text, one for pictures, and one for video or multimedia. In this scenario the text constants may have a highest assigned layer processing priority followed by a lower priority that both the dynamic text and the pictures and finished with the lowest assigned to both the video and multimedia. In such a case, the two layers (dynamic text and videos) can be processed last for formatting and together in parallel with one another at the same time on a multi core processing architecture.

It is also noted that with existing multi core processing capabilities that many devices possess today that layers of different types may also be processed in parallel with one another. In such case, if there are not enough processor cores to handle all the available layer types at one time, then the priorities dictate the processing order.

At 130, the layering service superimposes the formatted layers in response to the media sequence for purposes of rendering each unit of media for a final presentation format. Here, the superimposing may also be viewed as a type of merge. Components in a same layer are rendered to their specific unit of media in response to their media sequence number that identifies the particular unit to which a particular component is associated. As each formatted layer is rendered to the units, each unit includes merged components from the formatted layers.

As an example, consider a batch of checks as being the logic units of media. Each unit is a check. Each check includes some text or design graphics that are constant throughout the batch. The text or design graphics may be in an electronic format that is rendered or formatted in a print job to output a final presentation being a series of checks with the text and design graphics in a specific format and layout. Suppose further the checks have some dynamic text, such as the name and account number of a particular account holder. In this example, there are two layer types: constant text and dynamic text. The constant text can be formatted once for the entire batch and the dynamic text several times for each different account holder. When this is rendered to an output file that is subsequently sent to a printer to be printed on checks delivered to the account holders, the entire constant text layer can be rendered to the output file at once for each check (unit) then each different account holder can be rendered to the output file as a series of small merges or as a superimposition process.

This illustrative process is but one of many examples that can be used with the present teachings and is not intended to limit the present invention to this specific embodiment exclusively. Another example may entail IP TV having graphics and video or even video rendered to a phone. The point is that the technique of rendering media via layers can substantially improve processing throughput and can in some cases reduce memory load and/or bandwidth (since constant and unchanged and frequently occurring components can be send over a wireless or wired feed once and not with each page or frame (unit type)).

According to an embodiment and as discussed at length above, at 140, the layering service can iteratively process an entire multimedia stream where each unit is a frame. It can also iteratively process an entire document where each unit is a page. Moreover, it can iteratively process an entire WWW site where each unit is a WWW page. Further, as discussed above the layering service can iterative process batches of media for a variety of purposes, such as but not limited to mass check production, mass book or magazine production, mass mailings, mass emails, etc.

It is also noted and to be understood that multiple layers can be merged with the help of a rendering engine. For example, consider a document with a number of charts, diagrams, and tables. Every table, chart or diagram is a separate layer in the sense that they can be formatted independent of the remaining layers. Their regions' dimension in their units of media may be fixed or determined solely by their contents. There may also be a "glue" or dependency layer that contains the article of text and all the mentioned objects. The formatting may proceed in parallel with other layers (assuming as the inserts' dimensions are not needed for formatting of the glue layer). But, the illustrations, after being formatting into their rectangles, have to be put into unit (page) locations determined by the text flow. Thus, a last layer is used, and it is in a sense the parent layer of all illustration layers.

Again, formatting order of the layers can be simple or complex. Complex dependencies as to formatting order may be represented in a graph of dependencies. Each layer in a same processing order or priority set can process in any order once its prior dependency layers have processed.

Figure 2:
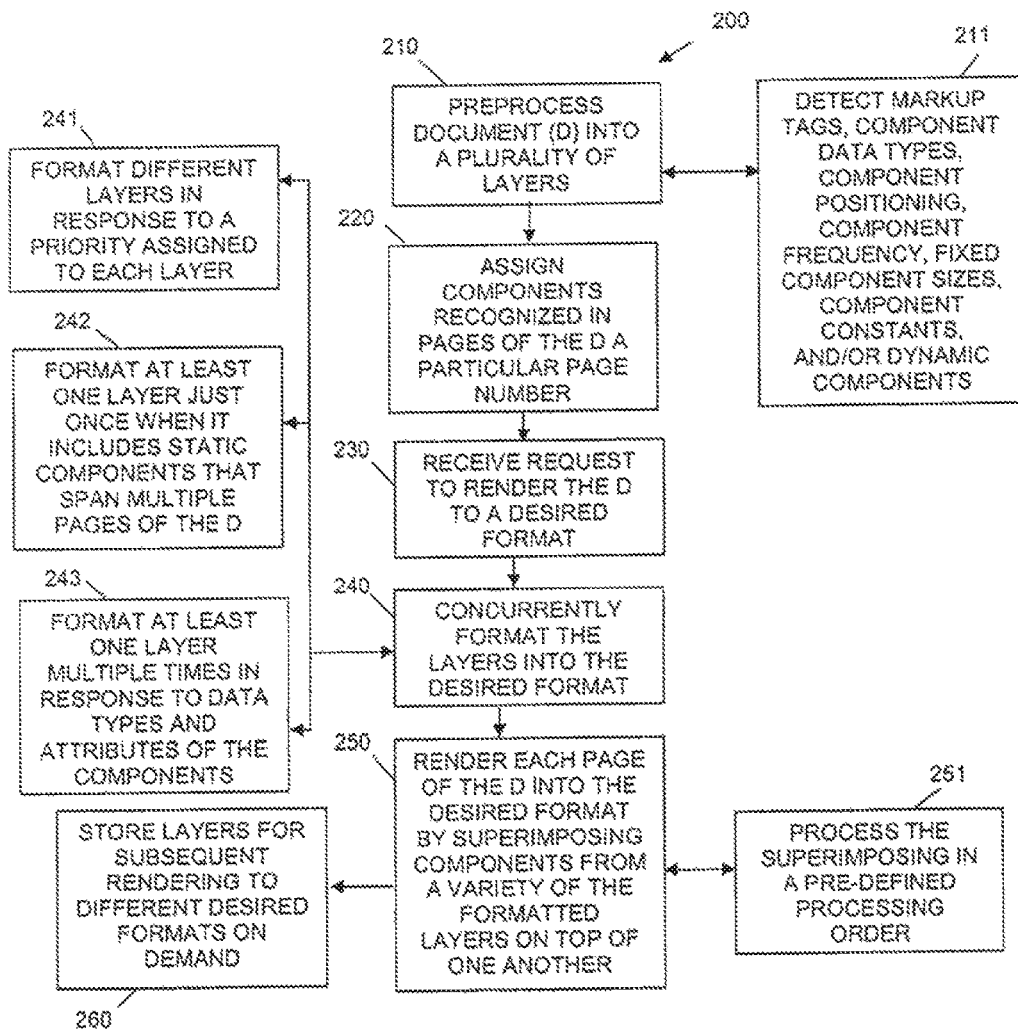
FIG. 2 is a diagram of another method for rendering media as layers, according to an example embodiment.

FIG. 2 is a diagram of another method 200 for rendering media as layers, according to an example embodiment. The method 200 (herein after "rendering service") is implemented in a machine-accessible and readable medium and is to process on a machine. The rendering service is also accessible and operational over a network, and the network may be wired, wireless or a combination of wired and wireless. The rendering service presents an alternative and in some cases enhanced perspective of the layering service represented by the method 100 of the FIG. 1.

At 210, the rendering service preprocesses a document into a plurality of layers. A variety of techniques can be used to achieve this decomposition of the document into layer types some of which were discussed in detail above with reference to the method 100 of the FIG. 1.

For example, at 211, the rendering service assigns layer types to the document by detecting markup tags, specific component data types, specific component positioning within pages of the document, component frequency occurring throughout the pages of the document, specific fixed sizes for components, component constants, and/or dynamic components (components that are resolved when rendering, such as components that require a search to be resolved, etc.).

At 220, the rendering service assigns components recognized in the pages of the document a particular page number. That is, when the document is assigned layer types each component of each page is assigned to a particular layer type. The page number on which each component natively and originally resides is carried as metadata with the component's assignment to a specific layer type. This permits proper positioning in the document for each component, since the components are being decomposed and assigned to specific layers. In other words, similar components may span multiple pages of the document and yet be assigned to the same layer type; so, by retaining the page number with each component, each component can be properly positioned in the document when it is subsequently rendered.

At 230, the rendering service receives a request to render the document to a desired format. The processing associated with 210-220 may be done independent of any subsequent request and that processing sets up an efficient and novel technique for rendering the document on demand to a variety of desired output formats.

At 240, the rendering service concurrently formats the layers into the desired format. Any conversion to take the native stored format of the document to a desired format may be used to get to the desired or target format. This concurrent processing can occur in a variety of manners.

However, it is noted that sets of layers may have dependencies that dictate that other sets of layers be formatted before them. This was discussed above with reference to the method 100 of the FIG. 1. Here, each set of layers in a same dependency relationship can process in any order and in parallel once prior dependencies for other sets of layers are processed. These dependencies, which may be hierarchical, can be represented in a graph that defines the dependencies between sets of layers.

For example, at 241, the rendering service formats different layers in response to a priority assigned to each layer. At 242, the rendering service formats at least one layer just once when it includes static or constant components that span multiple pages of the document. An example of this was presented above with respect to the check processing example. Still further, at 243, the rendering service formats at least one layer multiple times in response to date types and attributes of the components. Here, the layer processing may be layered, such that one layer is formatted and then formatted again with another layer. So, layer processing may be hierarchical or dependent on other layers associated with the document.

At 250, the rendering service renders each page of the document into the desired format by superimposing or merging components from a variety of the formatted layers on top of one another. For example, a first layer is rendered to the entire document across a plurality of pages and subsequent layers are rendered in the same manner and with each iteration a superimposition or merge takes place such that the document as a whole is gradually being rendered to the desired output or target format.

In an embodiment, at 251, the rendering service processes the superimposing or merging in a predefined processing order. In other words, layer processing can be done in a particular and prioritized manner, as was discussed above with reference to the method 100 of the FIG. 1. Priority assignments can be used here as well.

In still another embodiment, at 260, the rendering service stores the formatted layers for subsequent rendering to different desired formats. So, once the layers for the document are assigned, the data and metadata associated with that can be stored in an intermediate format and re-used to render to any desired format on demand.

Figure 3:
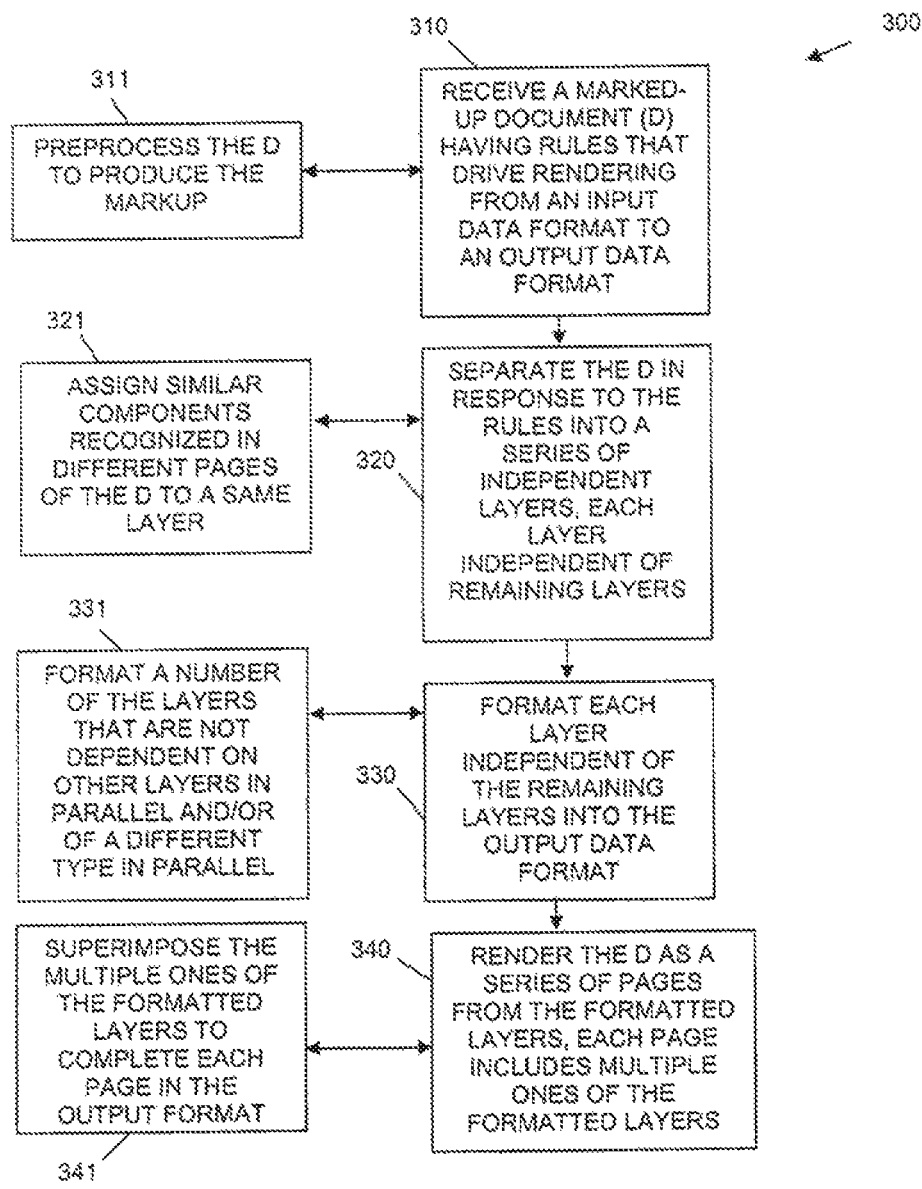
FIG. 3 is a diagram of a still another method for rendering media as layers, according to an example embodiment.

FIG. 3 is a diagram of a still another method 300 for rendering media as layers, according to an example embodiment. The method 300 (herein after "rendering and layering service") is implemented in a machine-accessible and readable medium and is to process on a machine. The rendering and layering service is also accessible and operational over a network, and the network may be wired, wireless or a combination of wired and wireless. The rendering and layering service presents yet another alternative and in some cases enhanced perspective of the layering service represented by the method 100 of the FIG. 1 and the rendering service represented by the method 200 of the FIG. 2.

At 310, the rendering and layering service receives a marked-up document having rules that drive rendering from an input data format to an output data format. As an example, consider a document encoded with XSL, the XSL includes rules for moving XML (one format) to another format, such as HTML. This is but one example, many more situations may apply and this example is not intended to limit the teachings presented herein.

In an embodiment, at 311, the rendering and layering service may have previously preprocessed the document to actually produce the markup and the rules. It may also be that the rendering and layering service enlists the assistance of a third-party preprocessing service to produce the markup and the rules.

At 320, the rendering and layering service separates the document in response to the rules into a series of independent layers. Each layer is independent in terms of its rendering needs from the remaining layers associated with the document.

According to an embodiment, at 321, the rendering and layering service assigns similar components included in different pages throughout the document to a same layer type. Various techniques and examples for determining what is a similar component was discussed above, such as components having similar page positioning, similar dependencies, etc.

At 330, the rendering and layering service formats each layer independent of the remaining layers into the output data format. So, each layer type is processed or formatted independent of the other layer types. However, any dependencies between sets of layers may drive when a particular set of layers may be formatted. Complex dependencies for sets of layers may be handled and processed in an automated manner using a graph that defines the dependencies between the sets of layers.

Depending upon the processing capabilities of the machine architecture that the rendering and layering service executes on a variety of scenarios may occur as well. For example, at 331, the rendering and layering service can format a number of the layers not dependent on other layers in parallel. Additionally, the rendering and layering service can format a number of layers having a different type in parallel. Still further, some layers may process before other layers and some layers may be processed and then reprocessed with a subsequent layer's processing (hierarchical or dependent layer processing).

At 340, the rendering and layering service renders the document as a series of pages from the formatted layers. Each page includes multiple ones of the formatted layers. In other words, a single page is rendered to multiple times and each page's components are gradually populated to that page.

In an embodiment, at 341, the rendering and layering service performs the rendering by superimposing or merging the multiple ones of the formatted layers to complete each page in the desired output data format.

One now appreciates how media having a plurality of units can be decomposed into a plurality of formatting layers. Each independent layer can be formatted and rendered independent of the other to improve the rendering process and increase processing throughput and in some cases decrease memory and bandwidth utilization.

The techniques presented herein are not limited to document processes as discussed above with reference to the method 100 of the FIG. 1, the techniques are also useful in multimedia and video rendering. Multimedia and video rendering using the layering techniques presented herein may be useful for rendering IP TV and/or for rendering video to small appliances with limited processing and memory capabilities, such as but not limited to digital phones.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    dividing units of media into layers and detecting each layer based on: tags, position within the media, and data types;
    assigning each layer a page or frame number within the media;
    concurrently formatting each layer; and
    superimposing the formatted layers into the media.

2. The method of claim 1, wherein dividing further includes preprocessing the units for assigning each unit to a particular layer.

3. The method of claim 1, wherein assigning further includes assigning each unique layer a processing order.

4. The method of claim 3, wherein concurrently formatting further includes formatting those layers assigned a higher processing order before other layers assigned a lower processing order.

5. The method of claim 1, wherein concurrently formatting further includes concurrently formatting sets of layers, each set associated with a layer type.

6. The method of claim 1 further comprising, iteratively processing the method for an electronic document, wherein the units of media are all pages of the electronic document.

7. The method of claim 1 further comprising, iteratively processing the method for a website, wherein the units of media are all web pages of the website.

8. The method of claim 1 further comprising, iteratively processing the method for a multimedia stream representing the units of the media.

9. The method of claim 1 further comprising, iteratively processing the method for a video, wherein the units of media are all frames of the video.

10. The method of claim 1 further comprising, iteratively processing the method for rendering the media to a display of a device.

11. A method, comprising:
    preprocessing media into a plurality of layers based on layer types that are identified from: tags, components, positions of the components within the media, and data types for the components;
    assigning the components to pages or frames associated with the media;
    concurrently formatting the layers with the components into a target format; and
    rendering each page or each frame into the target format by superimposing the formatted layers on top of one another in a predefined sequence defined by the layer types.

12. The method of claim 11, wherein concurrent formatting further includes formatting different layer types based on an assigned priority order.

13. The method of claim 11, wherein concurrently formatting further includes concurrently formatting static components across multiple different layer types.

14. The method of claim 11, wherein concurrently formatting further includes formatting at least one layer multiple times in response to different data types assigned to those components in the at least one layer.

15. The method of claim 11 further comprising, presenting the rendered media in the target format on a display of a device.

16. The method of claim 11 further comprising, sending the rendered media in the target format to a printer for printing.

17. The method of claim 11 further comprising, providing the rendered media when accessed through a website for presentation within the website.

18. A method, comprising:
    separating media into independent layers in response to instructions associated with the media based on components in the media identified by: tags, data types, and positions within the media;

concurrently formatting each layer independent of remaining layers into a target format;

rendering the layers by superimposing at least some layers on top of other layers to produce a final version of the media in the target format.

19. The method of claim 18 further comprising, delivering the final version to a display for presentation.

20. The method of claim 19 further comprising, delivering the final version to a printer for printing.

\* \* \* \* \*